(12) United States Patent
Okhai

(10) Patent No.: US 7,381,453 B2
(45) Date of Patent: Jun. 3, 2008

(54) PACKAGING FILM

(75) Inventor: Abdul Aziz Okhai, Dundee (GB)

(73) Assignee: International Trex, Ltd, Dundee Scotland (GB)

( * ) Notice: Subject to any disclaimer, the term of this patent is extended or adjusted under 35 U.S.C. 154(b) by 0 days.

(21) Appl. No.: 10/333,282

(22) PCT Filed: Jul. 23, 2002

(86) PCT No.: PCT/GB02/03344

§ 371 (c)(1),
(2), (4) Date: Mar. 14, 2003

(87) PCT Pub. No.: WO03/009997

PCT Pub. Date: Feb. 6, 2003

(65) Prior Publication Data

US 2004/0028851 A1   Feb. 12, 2004

(30) Foreign Application Priority Data

Jul. 23, 2001 (GB) ................. 01179092
Feb. 15, 2002 (GB) ................. 02036473

(51) Int. Cl.
  *B32B 1/08* (2006.01)
  *B65D 81/34* (2006.01)
  *B65D 65/40* (2006.01)
  *B65D 53/00* (2006.01)
  *B65D 51/16* (2006.01)

(52) U.S. Cl. .............. 428/34.1; 428/35.2; 428/35.4; 428/35.7; 215/260; 215/261; 215/270; 215/271; 215/307; 426/106; 426/112; 426/113; 426/118; 426/126

(58) Field of Classification Search ............... 428/35.2, 428/35.4, 35.7, 35.9, 36.7, 34.7, 315.5, 315.9, 428/346, 347, 349; 215/902, 247, 248, 260, 215/261, 270, 271, 307; 426/113, 118, 126, 426/127

See application file for complete search history.

(56) References Cited

U.S. PATENT DOCUMENTS

| 4,404,241 A | | 9/1983 | Mueller et al. ............... 428/35 |
| 4,657,133 A | * | 4/1987 | Komatsu et al. ............ 206/204 |
| 5,587,192 A | * | 12/1996 | Beizermann ................ 426/118 |
| 5,919,547 A | * | 7/1999 | Kocher et al. ............. 428/138 |
| 6,032,800 A | * | 3/2000 | Kocher .................... 206/459.5 |
| 6,068,898 A | * | 5/2000 | Oyama ...................... 428/35.2 |

FOREIGN PATENT DOCUMENTS

| EP | 0 358 461 A | | 3/1990 |
| EP | 0 481 730 A | | 4/1992 |
| GB | 2 355 956 A | | 5/2001 |
| JP | 63055075 A | * | 3/1988 |

* cited by examiner

*Primary Examiner*—Patricia L Nordmeyer
(74) *Attorney, Agent, or Firm*—Jones Day

(57) ABSTRACT

The present invention relates to packaging film for use in packaging of food products which may be heated whilst still packaged. In particular, the invention relates to packaging which may be hermetically sealed and, during heating, is able to allow a build up of pressure within the packaging, without the packaging exploding or bursting.

49 Claims, 4 Drawing Sheets

PACKAGING FILM

Figure 1:
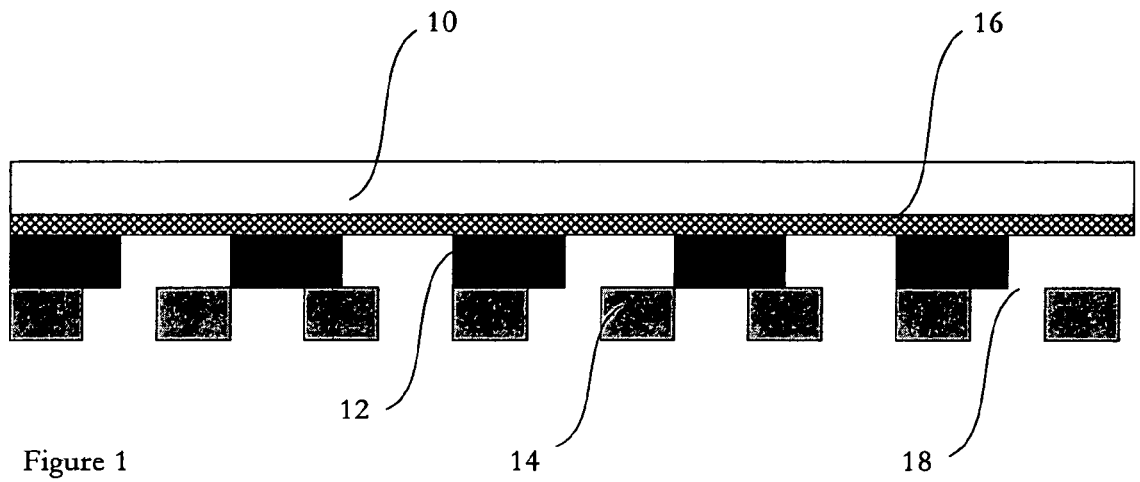

The present invention relates to packaging film for use in packaging of food products which may be heated whilst still packaged. In particular, the invention relates to packaging which may be hermetically sealed and, during heating, is able to allow a build up of pressure within the packaging, without the packaging exploding or bursting.

With the ever-increasing demand for convenience foods, such as so-called ready-meals which merely require heating before consumption, there is a requirement for an economic method of rapid cooking. Consumers demand products which require as short a preparation time as possible, whilst maintaining the quality of the heated food.

Cooking under pressure is a well known method of speeding up the cooking process. Not only can pressure cooking reduce the cooking time by 50%, if not more, but it can also result in a cooked product which is more succulent and tender, due to the retention of moisture in the package for at least part of the cooking process.

The present invention seeks to exploit this known style of cooking in order to improve the speed of food preparation and the quality of the heated food. However, in order to do this, it is necessary to not only provide sealed packaging within which the pressure can build up, but to also ensure that the pressure inside the package does not exceed the threshold above which the packaging will explode or burst.

Various attempts have been made in the past to provide packaging which "self vents" above a certain pressure and/or temperature threshold.

U.S. Pat. No. 4,141,487 discloses packaging with a pleated cover film. An aperture is formed along one of the creases in the cover film, which acts as a vent and releases the pressure which builds up within the packaging during heating. Before heating, the aperture is hidden by the pleating and a thin layer of an adhesive sealant material is applied to hold the cover film in the pleated configuration and to keep the vent sealed within the pleat. The sealant is preferably one with a melting temperature which means that the pleat will unfold during cooking, thereby opening the vent and allowing vapour to escape as pressure builds up inside the packaging.

U.S. Pat. No. 4,404,241 disclose a packaging material having a multi-layer substrate with apertures. The apertures are sealed by a continuous layer of an extrudable hot melt material which is bonded to the substrate. When the packaging is heated, the hot melt material becomes viscous and permeable to vapour, thereby allowing venting.

U.S. Pat. No. 5,989,608 describes a complex valve structure in the cover film, to allow venting. The valve comprises a substrate film which is positioned over an aperture in the cover film and is attached to the cover film by an adhesive layer. A separator film is positioned between the adhesive layer and the aperture, thereby separating the adhesive layer from the food contained within the packaging. Once the temperature exceeds a given threshold, the adhesive allows the substrate film to become detached from the cover film, allowing venting through the aperture. Whilst such valves can be effective, they are also difficult to manufacture and can significantly increase the cost of the packaging.

The present invention seeks to provide packaging which self-vents once a given temperature and pressure within the packaging has been reached. The packaging should also be capable of being hermetically sealed to maintain the internal package atmosphere and extend the shelf life of the packaged product. Finally, it is also an aim of the present invention to provide packaging which is cheap and easy to manufacture.

The most common type of packaging used for ready-meals is a container, such as a tray, within which the food sits, the container being sealed using a film which is welded to the container, usually along a flange surrounding the opening of the container. That said, the present invention may, of course, be applied to other types of packaging, for example bags.

In accordance with a first aspect of the invention, a packaging film is provided comprising a carrier layer, a heat seal layer and a perforated seal layer. When the packaging film is sealed, generally using the application of heat and pressure, the layers of thereof become welded to one another and to the rest of the packaging article. Sort specifically, the heat seal layer of the packaging forms an airtight seal between the carrier layer and the perforated seal layer in the area where the packaging film is sealed. Thus, the package is hermetically sealed.

In one embodiment, the heat seal layer is applied to the carrier layer. The heat seal layer is then intermittently attached to a perforated seal layer using an adhesive. This can be achieved, for example, by using strips of adhesive.

In an alternative embodiment, the heat seal layer is applied to the perforated seal layer. Optionally, the heat seal layer is then intermittently attached to the carrier layer using an adhesive.

In yet another embodiment, the heat seal layer is applied to both the carrier layer and the perforated seal layer. The two heat seal layers may then be intermittently attached to one another using an adhesive.

In a further preferred embodiment, no intermittent adhesive is used. Rather, the carrier layer and the perforated seal layer are adhered to one another by the heat seal layer upon sealing the packaging film, with the application of heat and pressure. This embodiment works when the heat seal layer is applied to either the carrier layer, the perforated seal layer, or both.

When a packaging article sealed with a packaging film according to the first aspect of the present invention is heated, pressure will start to build up inside the container, allowing pressure cooking. When a certain temperature and pressure has been reached within the container, the heat seal layer positioned between the carrier layer and the perforated seal layer becomes gas permeable and may even give way completely. At this point, the pressure from inside the package will be released to the exterior of the container through channels formed by the perforations in the perforated seal layer and the areas between the carrier layer and the perforated seal layer which were joined by the heat seal layer, which is now gas permeable or has given way. Once such venting has occurred, a balanced state is maintained, as any excess pressure continues to vent out of the container where the heat seal lacquer have given way.

The heat seal material used is chosen to provide venting at a desired temperature and pressure. Preferably, venting occurs at a temperature below 150° C., and more preferably below 100° C. It may also be advantageous to use heat seal material which becomes viscous and gas permeable at elevated temperatures, but which is not permeable to liquids. This will allow release of the pressure, whilst keeping moisture sealed within the packaging, thereby keeping the heated food succulent. It will also prevent undesirable spurting of hot liquid out of the container once venting has started.

Heat seal materials which may be used in the packaging film of the present invention include: polyester film with a heat seal layer extruded or coated onto it with or without a primer; cast or blown polypropylene film; a laminate of polyester or nylon film to cast or blown polypropylene film; polyethylene film; and laminate of polyester or nylon film to cast or blown polythene film or other heat-sealable polymers.

The carrier layer can be made from a variety of known materials, such as paper, nylon, cellophane or polyester. The material must be thermally stable, and should also be impermeable to gas and liquid. This impermeability may be achieved by applying an impermeable coating to the carrier layer material, if necessary. Alternatively, the layer of heat seal material applied to the carrier layer may act as a barrier to gas and liquid prior to heating. The preferred material for the carrier layer is polyester although alternative materials which are impermeable to gas and suitable for contact with food materials could also be used.

Appropriate materials for the container should also be selected, with a view to the proposed mode of heating. For example, a polypropylene container would be suitable for microwave heating, but not for heating in a conventional oven. CPET containers are commonly used to package ready-meals, as they can be heated in both microwave and conventional ovens. Preferably, the container is made from a material which retains its structural integrity at high temperatures and does not become soft or pliable which will make the container difficult to carry or make it more difficult to remove the covering film.

The perforated seal layer is preferably selected for optimal adhesion to the material from which the container or the rest of the packaging is formed. In one embodiment, the perforated seal layer material is polyester. Such a perforated polyester seal layer is heat-sealable to a CPET tray. However, a polyester perforated seal layer will not seal satisfactorily to certain materials, such as polypropylene. Thus, if the container were composed of, for example, polypropylene, then the perforated seal layer could either be formed from polypropylene alone, or it could be a laminate of materials, including a layer of polypropylene adjacent to the container.

In another embodiment of the invention, a packaging film is provided comprising a carrier layer which is intermittently adhered to a perforated seal layer. The film does not include a heat seal layer. A packaging article incorporating such a packaging film will not be hermetically sealed, i.e., the contents of the packaging will be open to the atmosphere to a certain extent. Thus, this packaging film is breathable and is useful for the packing produce such as fruits and vegetables. However, the packaging will still allow a degree of pressure build-up upon heating, thereby allowing pressure cooking of the packaging contents to a certain extent.

In a further preferred embodiment of the invention, the packaging film according to the invention includes a so-called susceptor film. A susceptor film is a lightly metalised film which acts as a resistor to microwaves. As a susceptor film is exposed to microwave radiation, it becomes hot and acts as a cooking instrument, providing a source of intense heat. A normal metalised film with an optical density of 2 to 2.5 units acts as a conductor and leads to arcing in a microwave oven. In contrast, a susceptor film that is metalised with an optical density of 0.2 to 0.4 acts instead as a resistor to microwaves and therefore heats up to high temperatures, in excess of 200° C.

The incorporation of a susceptor film in the packaging film combines the effect of "super-heat" and pressure cooking. This can reduce the cooking time to around 25% of the normal time required to cook the same product. In addition, the consumer requires no additional cooking utensils or the like.

A susceptor film is usually made by metalising a polyester film. Because the susceptor film heats up to extreme temperatures when microwaved and the polyester film is thermoplastic, the susceptor film will shrivel up and melt during cooking. Therefore, in order for the susceptor film to work, it should be laminated to a non-thermoplastic material such as paper or cellophane, which stabilises it.

The susceptor film can be incorporated into any of the embodiments of the first aspect of the present application and it is preferably added to the perforated seal layer or the carrier layer. Some of the embodiments including a susceptor film are illustrated in the figures and are described in detail below.

According to a second aspect of the present invention, a packaging article is provided, comprising a packaging film according to the first aspect pf the present invention.

In one embodiment, the packaging article comprises a container, such as a tray, the opening of which is sealed using a packaging film according to the first aspect of the invention.

In an alternative embodiment, the packaging article is a bag, at least part of which is formed from a packaging film according to the first aspect of the present invention.

The bags could be made and then filled, or they could be made and filled simultaneously using appropriate machinery.

Figure 6:
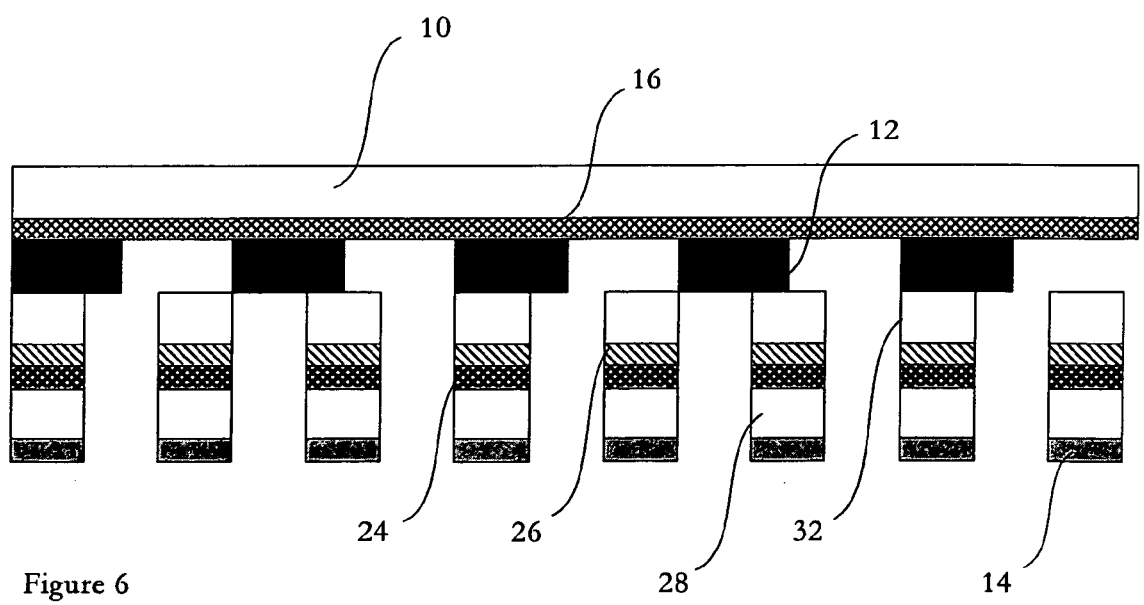
Figure 7:
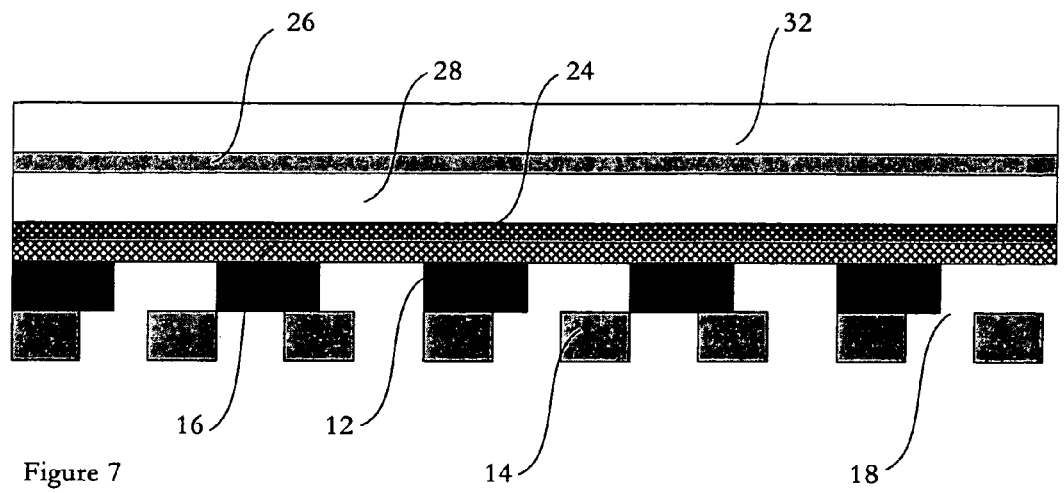
Figure 8:
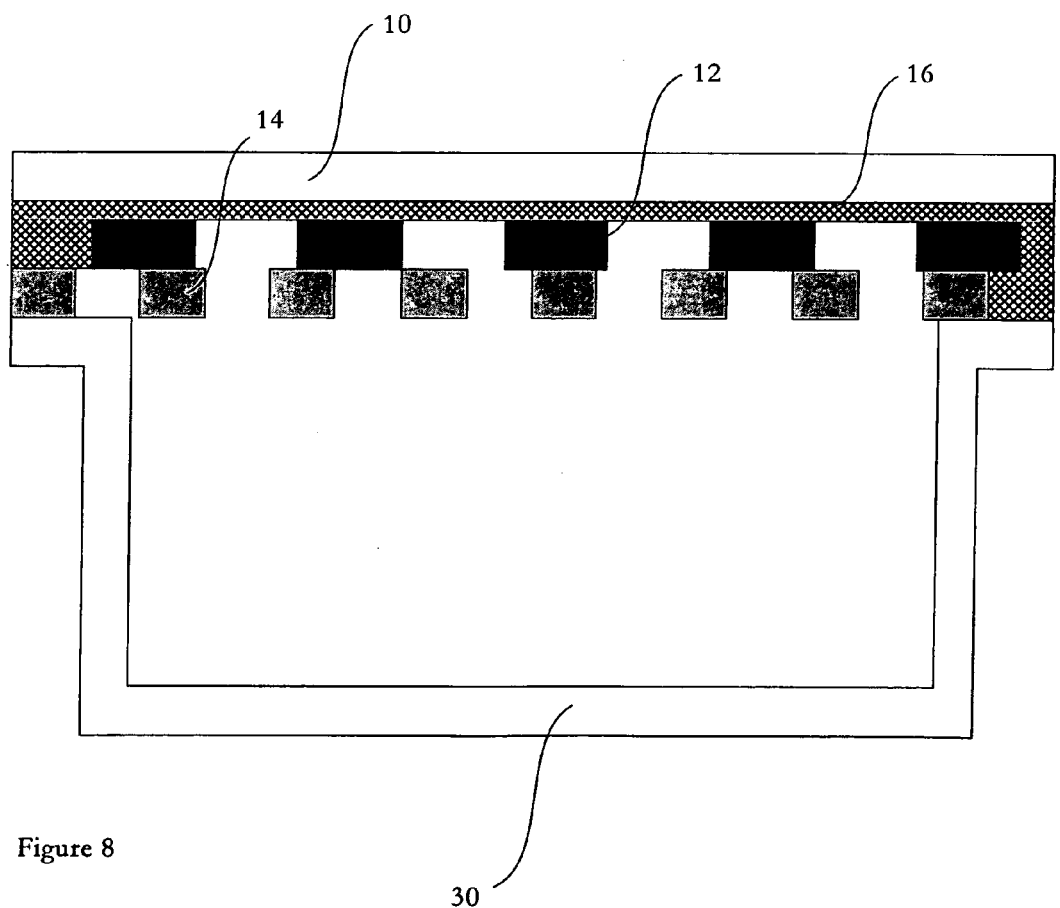

Embodiments of the invention are now described by way of example only, with reference to the accompanying drawings, in which:

FIGS. 1 to 7 each show a schematic cross-sectional view of a packaging film in accordance with an embodiment of the first aspect of the present invention; and FIG. 8 shows a schematic cross-sectional view of a packaging article according to the second aspect of the invention.

FIG. 1 shows a packaging film wherein the carrier layer 10 is coated with a heat seal layer 16. The heat seal layer is strip laminated to a perforated seal layer 14 using strips of adhesive 12. Channels 18 are formed between the perforations in the perforated seal layer 14 and the areas where there is no intermittent adhesive 12 between the carrier layer 10 and the perforated seal layer 14. When the packaging film is sealed to a container, the carrier layer with the heat seal layer becomes attached to the perforated seal layer and the container, and the channels 18 are sealed. When the packaging is heated, the heat seal layer releases, opening the channels and allowing venting.

Figure 2:
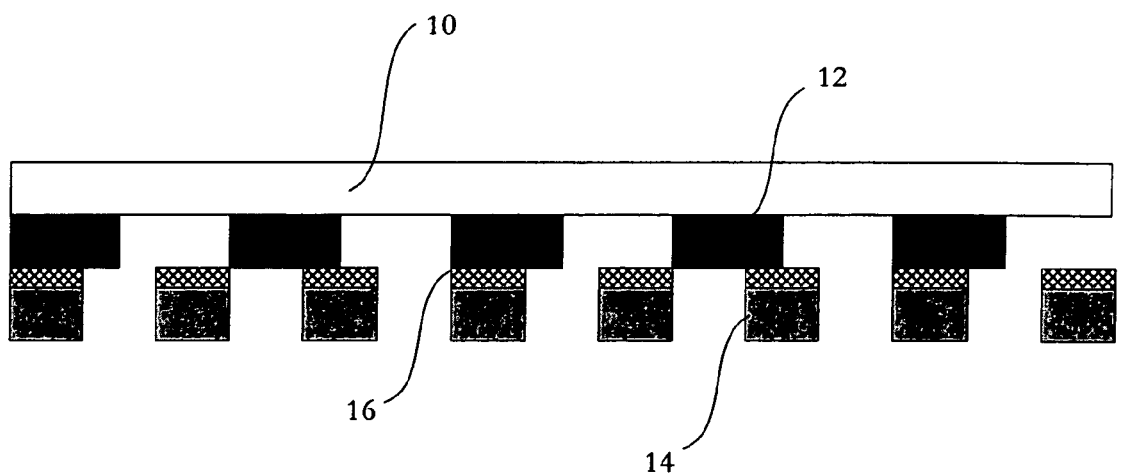

FIG. 2 shows an embodiment wherein the heat seal layer of the packaging film is applied to the perforated seal layer, and it is adhered to the carrier layer using strips of adhesive.

Figure 3:
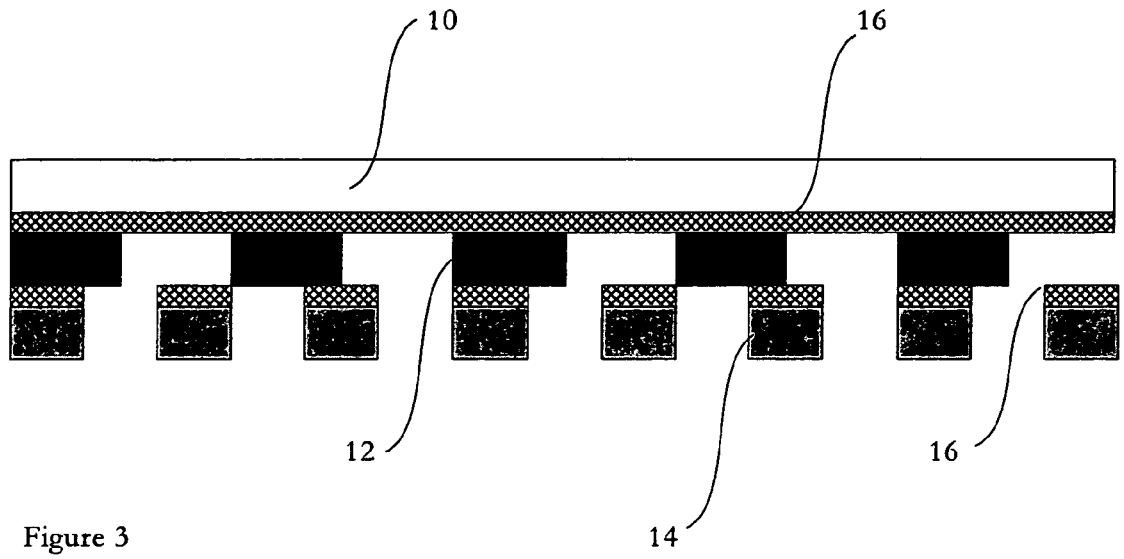

In the embodiment shown in FIG. 3, the heat seal layer is applied to both the carrier layer and the perforated seal layer. Strips of adhesive are positioned between the two heat seal layers.

Figure 4:
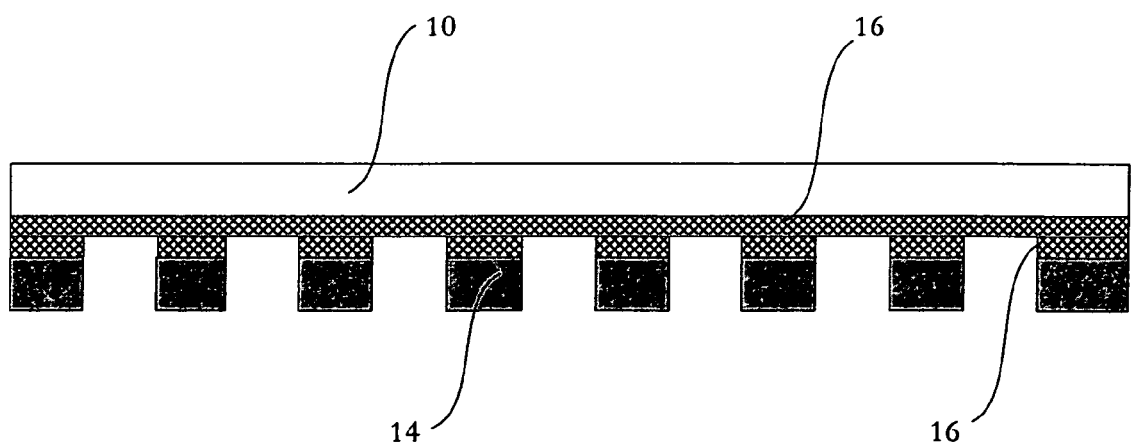

FIG. 4 shows an alternative embodiment, wherein there is no intermittent adhesive present. The layers of the packaging film will be adhered to one another upon welding.

Figure 5:
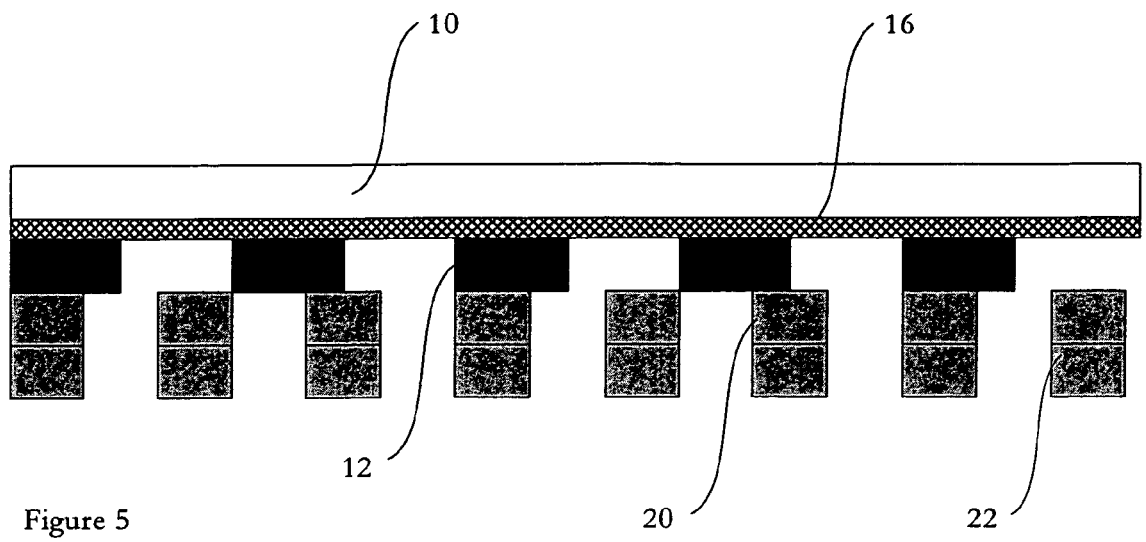

FIG. 5 shows an alternative embodiment of the present invention, wherein the perforated seal layer comprises a laminate of two different materials. Thus, for example, the layer 20 is polyester, whilst layer 22 is polypropylene. Such a film may be sealed to a propylene container.

FIG. 6 illustrates a further embodiment of the present invention, wherein the packaging film includes a susceptor film added to the perforated seal layer, forming a susceptor laminate. The susceptor laminate comprises a sheet of cellophane or paper 32, a layer of adhesive 26, susceptor metalisation 24, a sheet of polyester to which susceptor metalisation is applied 28, and a perforated seal layer 14.

FIG. 7 shows a packaging film whereby the susceptor film is added to the carrier layer, forming a susceptor laminate. The susceptor laminate includes a layer comprising cellophane or paper 32, a layer of adhesive 26, susceptor metalisation 24, a sheet of polyester to which susceptor metalisation is applied 28, and a heat seal layer 16.

FIG. 8 shows a packaging film according to the first aspect of the invention, sealed to a container 30, forming a packaging article according to the second aspect of the invention.

Permutations and combinations of various described embodiments of the invention can be used, whilst retaining the desired basic properties of the packaging film and/or packaging article described herein.

The invention claimed is:

1. A packaging film comprising:
a carrier layer which is impermeable to gases and fluids and a perforated seal layer which may be heat sealed to a packaging material to which the packaging film is to be attached, wherein the carrier layer and the perforated seal layers are adhered to one another directly upon sealing the packaging film to a packaging material opening with an application of heat and pressure wherein the heat seal releases when heated to a predetermined temperature to allow the packaging material to vent during heating.

2. A packaging film comprising:
a carrier layer which is impermeable to gases and fluids, having two sides;
a perforated seal layer having two sides; and
a heat seal layer which is impermeable to gases and fluids, applied to one of the two sides of either the carrier layer or the perforated seal layer; wherein the carrier layer and the perforated seal layer are adhered to one another by the heat seal layer upon sealing the packaging film to a packaging material and said packaging film hermetically seals said packaging material, opening with an application of heat and pressure;
wherein the heat seal layer releases when heated to a predetermined temperature to allow the packaging material to vent during heating.

3. A packaging film comprising:
a carrier layer which is impermeable to gases and fluids;
a heat seal layer which is impermeable to gases and fluids, applied to the carrier layer; and
a perforated seal layer, whereby the heat seal layer is positioned between the carrier layer and the perforated layer;
wherein:
the perforated seal layer comprises a plurality of perforations forming channels which are closed when the packaging film is sealed to a packaging material and said packaging film hermetically seals said packaging material; and the heat seal layer releases when heated to a predetermined temperature allowing said channels to open to allow venting during heating.

4. A packaging film according to claim 3, wherein the heat seal layer is intermittently attached to the perforated seal layer by an adhesive.

5. A packaging film according to claim 3, wherein the heat seal layer and the perforated seal layer are attached by strips of adhesive.

6. A packaging film according to claim 3, wherein the carrier layer is polyester, nylon, cellophane, or coated paper.

7. A packaging film according to claim 3, wherein the perforated seal layer comprises polyester.

8. A packaging film according to claim 3, wherein the perforated seal layer is a laminate of two or more materials.

9. A packaging film according to claim 8, wherein one of the materials of the laminate is polypropylene.

10. A packaging film according to claim 3, wherein the film further includes a susceptor film comprising a lightly metallized film.

11. A packaging film according to claim 10, wherein the susceptor film is laminated to a non-thermoplastic material.

12. A packaging film according to claim 10, wherein the susceptor film has an optical density of 0.2 to 0.5.

13. A packaging film according to claim 10, wherein the susceptor film is incorporated into the perforated seal layer.

14. A packaging film according to claim 13, wherein the susceptor film is perforated.

15. A packaging film according to claim 10, wherein the susceptor film is incorporated into the carrier layer.

16. A packaging film comprising:
a perforated seal layer comprising a plurality of channels;
a heat seal layer which is impermeable to gases and fluids, applied to the perforated layer; and
a carrier layer which is impermeable to gases and fluids, attached to the heat seal layer opposite the perforated seal layer;
wherein the channels are sealed when the packaging film is sealed to a packaging material and said packaging film hermetically seals said packaging material;
and the heat seal layer releases when heated to a predetermined temperature to allow the channels to become unsealed during heating.

17. A packaging film according to claim 16, wherein the heat seal layer is intermittently attached to the carrier layer by an adhesive.

18. A packaging film according to claim 16, wherein the heat seal layer and the carrier layer are attached by strips of adhesive.

19. A packaging film according to claim 16, wherein the carrier layer is polyester, nylon, cellophane, or coated paper.

20. A packaging film according to claim 16, wherein the perforated seal layer comprises polyester.

21. A packaging film according to claim 16, wherein the perforated seal layer is a laminate of two or more materials.

22. A packaging film according to claim 21, wherein one of the materials of the laminate is polypropylene.

23. A packaging film according to claim 16, wherein the film further includes a susceptor film comprising a lightly metalized film.

24. A packaging film according to claim 23, wherein the susceptor film is laminated to a non-thermoplastic material.

25. A packaging film according to claim 23, wherein the susceptor film has an optical density of 0.2 to 0.5.

26. A packaging film according to claim 23, wherein the susceptor film is incorporated into the perforated seal layer.

27. A packaging film according to claim 26, wherein the susceptor film is perforated.

28. A packaging film according to claim 23, wherein the susceptor film is incorporated into the carrier layer.

29. A packaging film comprising:
a carrier layer which is impermeable to gases and fluids, having two sides;

a first heat seal layer which is impermeable to gases and fluids, applied to one of the two sides of the carrier layer;

a perforated seal layer having two sides; and a second heat seal layer applied to one of the two sides of the perforated seal layer, wherein the carrier layer and the perforated seal layer are adhered to one another by the heat seal layers upon sealing the packaging film to an opening of a packaging material with an application of heat and pressure, and said packaging film hermetically seals said packaging material, wherein the heat seal layers release when heated to a predetermined temperature to allow the packaging material to vent during heating.

30. A packaging film comprising:

a carrier layer which is impermeable to gases and fluids, having two sides;

a first heat seal layer which is impermeable to gases and fluids, applied to one of the two sides of the carrier layer;

a perforated seal layer having two sides comprising a plurality of perforations forming channels; and a second heat seal layer applied to one of the two sides of the perforated seal layer, wherein the two heat seal layers are intermittently attached by an adhesive;

wherein the channels are closed when the packaging film is sealed to a packaging material, and the heat seal layers release when heated to a predetermined temperature to allow the channels to open during heating.

31. A packaging film according to claim 30, wherein the two heat seal layers are attached by strips of adhesive.

32. A packaging film according to claim 30, wherein the carrier layer is polyester, nylon, cellophane, or coated paper.

33. A packaging film according to claim 30, wherein the perforated seal layer comprises polyester.

34. A packaging film according to claim 30, wherein the perforated seal layer is a laminate of two or more materials.

35. A packaging film according to claim 34, wherein one of the materials of the laminate is polypropylene.

36. A packaging film according to claim 30, wherein the film further includes a susceptor film comprising a lightly metalized film.

37. A packaging film according to claim 36, wherein the susceptor film is laminated to a non-thermoplastic material.

38. A packaging film according to claim 36, wherein the susceptor film has an optical density of 0.2 to 0.5.

39. A packaging film according to claim 36, wherein the susceptor film is incorporated into the perforated seal layer.

40. A packaging film according to claim 39, wherein the susceptor film is perforated.

41. A packaging film according to claim 36, wherein the susceptor film is incorporated into the carrier layer.

42. A packaging article comprising a packaging film as claimed in any one of claims 1, 16, 30, 29 and 2.

43. A packaging article according to claim 42, wherein the article further comprises a container having at least one opening which is closed by the packaging film wherein the perforated seal layer of the packaging film is in contact with the container.

44. A packaging article according to claim 43, wherein the container has a flange around the at least one opening and the packaging film is sealed to the flange by an application of heat and pressure.

45. A packaging article according to claim 43, wherein the container is composed of polypropylene and the perforated seal layer comprises a polypropylene layer adjacent to the container.

46. A packaging article according to claim 43, wherein the perforated seal layer comprises polyester and the container is composed of crystalline poly (ethylene terephthalate) with or without an amorphous poly (ethylene terephthalate) layer.

47. A packaging article according to claim 42, wherein the article is a bag, at least a portion of which is formed from the packaging film.

48. A packaging article according to claim 42, wherein the perforated seal layer and the heat seal layer seal the packaging article and prevent egress of gas or liquid.

49. A packaging article according to claim 42, for heating food products contained therein in a microwave or a conventional oven.

* * * * *